(12) United States Patent
Kurzweil et al.

(10) Patent No.: US 8,392,186 B2
(45) Date of Patent: Mar. 5, 2013

(54) AUDIO SYNCHRONIZATION FOR DOCUMENT NARRATION WITH USER-SELECTED PLAYBACK

(75) Inventors: Raymond C. Kurzweil, Newton, MA (US); Paul Albrecht, Bedford, MA (US); Peter Chapman, Bedford, MA (US); Lucy Gibson, Belmont, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 328 days.

(21) Appl. No.: 12/781,977

(22) Filed: May 18, 2010

(65) Prior Publication Data

US 2011/0288861 A1 Nov. 24, 2011

(51) Int. Cl.
*G10L 15/26* (2006.01)
*G10L 15/00* (2006.01)
*G10L 15/04* (2006.01)

(52) U.S. Cl. .................. 704/235; 704/231; 704/251

(58) Field of Classification Search .................. 704/231, 704/235, 251, 270, 271, 276
See application file for complete search history.

(56) References Cited

U.S. PATENT DOCUMENTS

| | | | | |
|---|---|---|---|---|
| 5,649,060 | A * | 7/1997 | Ellozy et al. ................. | 704/278 |
| 6,188,983 | B1 * | 2/2001 | Hanson ......................... | 704/260 |
| 6,226,615 | B1 * | 5/2001 | Kirby et al. .................. | 704/272 |
| 8,065,142 | B2 * | 11/2011 | Imoto et al. .................. | 704/231 |
| 2002/0143534 | A1 * | 10/2002 | Hol .............................. | 704/235 |
| 2008/0140413 | A1 * | 6/2008 | Millman et al. .............. | 704/270 |
| 2010/0299131 | A1 * | 11/2010 | Lanham et al. ................. | 704/2 |

* cited by examiner

*Primary Examiner* — Jessee Pullias
(74) *Attorney, Agent, or Firm* — Fish & Richardson P.C.

(57) ABSTRACT

Disclosed are techniques and systems to provide a narration of a text. In some aspects, the techniques and systems described herein include generating a timing file that includes elapsed time information for expected portions of text that provides an elapsed time period from a reference time in an audio recording to each portion of text in recognized portions of text.

18 Claims, 13 Drawing Sheets

AUDIO SYNCHRONIZATION FOR DOCUMENT NARRATION WITH USER-SELECTED PLAYBACK

BACKGROUND

This invention relates generally to educational and entertainment tools and more particularly to techniques and systems which are used to provide a narration of a text.

Text can be displayed on a screen or other user interface device. The user interface device allows a user to select portions of text and indicate various processing for those portions of text.

Recent advances in computer technology and computer based speech synthesis have opened various possibilities for the artificial production of human speech. A computer system used for artificial production of human speech can be called a speech synthesizer. One type of speech synthesizer is text-to-speech (TTS) system which converts normal language text into speech.

Other advances in computer technology have opened various possibilities for the processing of recorded human speech. A computer system for transforming a recording of human speech into text can be called a speech recognition system or speech-to-text system.

SUMMARY

Educational and entertainment tools and more particularly techniques and systems which are used to provide a narration of a text are described herein.

In some aspects, a computer implemented method includes applying speech recognition by one or more computer systems to an audio recording to generate a text version of recognized portions of text. The method also includes determining by the one or more computer systems an elapsed time period from a reference time in the audio recording to each portion of text in the recognized portions of text. The method also includes comparing by the one or more computer systems a recognized portion of text to an expected portion of text. The method also includes generating by the one or more computer systems a timing file that is stored on a computer-readable storage medium, the timing file comprising the elapsed time information for each expected portion of text. The method also includes receiving from a user an indication of a user-selected portion of text and determining by the one or more computers an elapsed time in the audio recording by referencing the timing file associated with the user-selected portion of text. The method also includes providing an audible output corresponding the audio in the audio recording at the determined elapsed time in the audio recording.

In some aspects, a computer implemented method includes applying speech recognition by one or more computer systems to an audio recording to generate a text version of recognized portions of text. The method also includes providing an audible output corresponding to the audio recording. The method also includes displaying, on a user interface rendered on a display device, an expected portion of text that corresponds to the words in the audio recording, the displayed expected portion of text including at least a portion of the expected portion of text that is currently being provided on the audible output. The method also includes providing visual indicia for the displayed text that corresponds to the audio that is currently being provided on the audible output, if the recognized portion of text matches the corresponding expected portion of text; and otherwise one or more portions of text which does not match the recognized portion of text, if the recognized portion of text does not match the corresponding expected portion of text.

In some aspects, a computer implemented method includes applying speech recognition by one or more computer systems to an audio recording to generate a text version of recognized portions of text. The method also includes comparing by the one or more computer systems the recognized portion of text to an expected portion of text. The method also includes providing an audible output corresponding to the audio recording and determining by the one or more computer systems a recognized portion of text corresponding to a currently audible portion of the audio recording. The method also includes displaying an expected portion of text on a user interface rendered on a display device such that the displayed expected portion of text includes at least an expected portion of text previous to the determined currently audible portion of the audio recording. The method also includes providing visual indicia for the displayed expected portion of text that corresponds to the expected text portion that is previous to the currently audible portion of the audio recording, if the recognized portion of text is in addition to and not included in the expected portion text.

In some aspects, a computer implemented method includes applying speech recognition by one or more computer systems to an audio recording to generate a text version of recognized words. The method also includes determining the linguistic units of one or more recognized words. The method also includes computing a timing for each determined linguistic unit. The method also includes determining the linguistic units of one or more words in an expected portion of text. The method also includes associating linguistic units in the one or more words in the expected portion of text with linguistic units in the recognized words and computing a timing for one or more linguistic units in the one or more words in the expected portion of text based on the timing of one or more corresponding determined linguistic units of the one or more recognized words.

Embodiments can include one or more of the following.

Generating the timing file can include storing the elapsed time information for a recognized portion of text in the timing file if the recognized portion of text matches the corresponding expected portion of text and computing elapsed time information for an expected portion of text and storing the computed elapsed time information into the timing file if the recognized portion of text does not match the corresponding expected portion of text.

The recognized portions or expected portions of text can be words.

Computing the elapsed time information can include determining an elapsed time period for each expected text portion and the method can also include determining by one or more computer systems the number of syllables or phonemes in an expected word that is part of the expected portion of text, determining by the one or more computer systems the corresponding recognized portion that is associated with that same number of syllables or phonemes in the expected word, determining by the one or more computer systems an elapsed time for the corresponding recognized portion, and storing the determined elapsed time to a timing file that is stored on a computer-readable storage medium.

Computing can also include determining the elapsed time for an expected portion of text based on a metric associated with an expected length of time to speak the expected portion of text.

Providing an audible output can include providing audio beginning with a first word in the user-selected portion of text and continuing until the end of the document.

Providing an audible output can include providing audio corresponding to the user-selected portion of text.

The method can also include ceasing providing the audio output upon reaching a last word in the user-selected portion of text.

One or both of determining the linguistic units of the one or more recognized words and determining the linguistic units of the one or more words in the expected portion of text can include referencing information associated with the linguistic units of words.

Computing the timing for the one or more of linguistic units of the one or more recognized words can include referencing information associated with the relative timing of linguistic units and using the determined elapsed time for each recognized word.

Embodiments may also include devices, software, components, and/or systems to perform any features described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
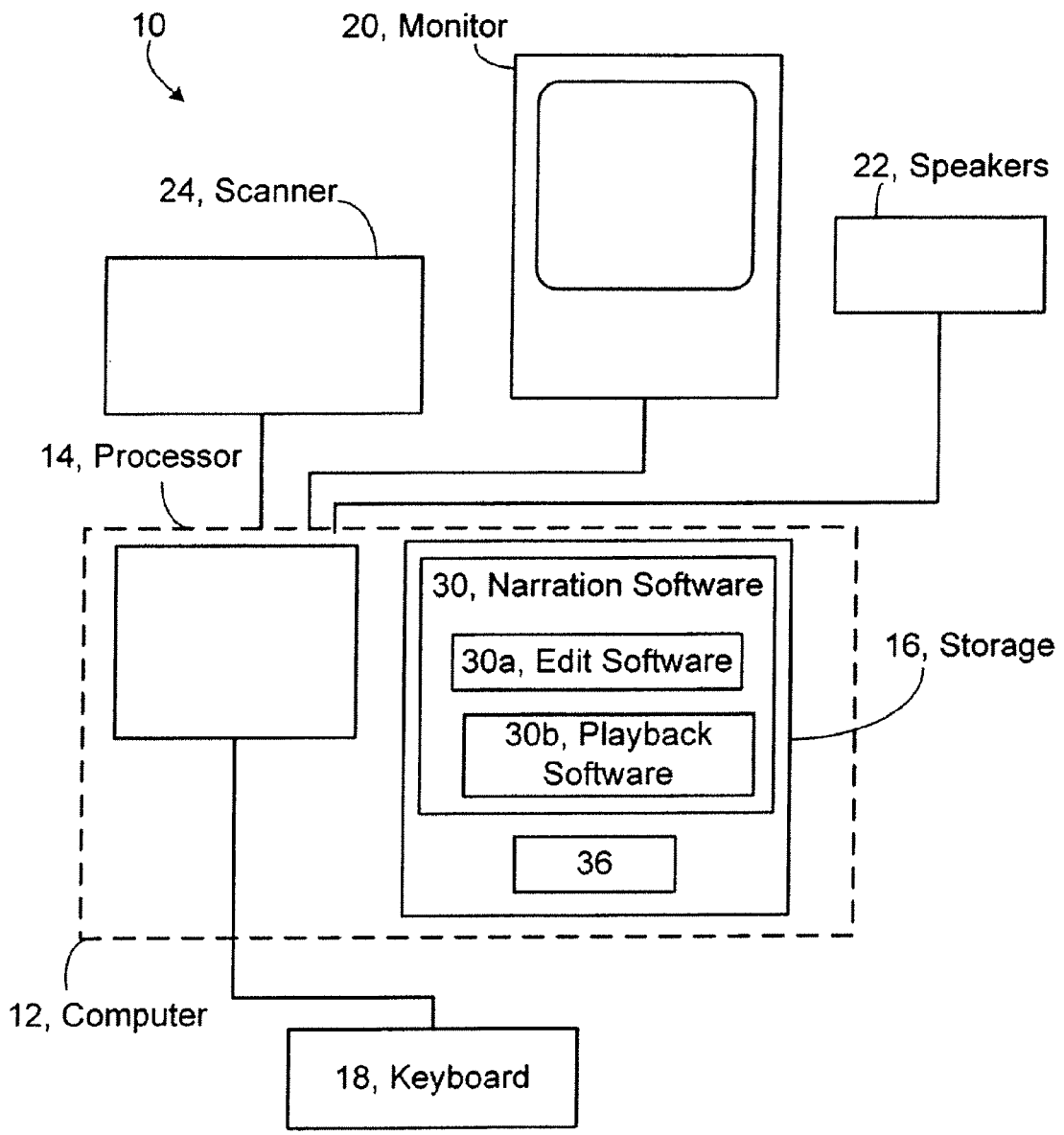
FIG. 1 is a block diagram of a system for producing speech-based output from text.

Referring now to FIG. 1, a system 10 for producing speech-based output from text is shown to include a computer 12. The computer 12 is generally a personal computer or can alternatively be another type of device, e.g., a cellular phone that includes a processor (e.g., CPU). Examples of such cellphones include an iPhone® (Apple, Inc.). Other devices include an iPod® (Apple, Inc.), a handheld personal digital assistant, a tablet computer, a digital camera, an electronic book reader, etc. In addition to a processor, the device includes a main memory and a cache memory and interface circuits, e.g., bus and I/O interfaces (not shown). The computer system 12 includes a mass storage element 16, here typically the hard drive associated with personal computer systems or other types of mass storage, Flash memory, ROM, PROM, etc.

The system 10 further includes a standard PC type keyboard 18, a standard monitor 20 as well as speakers 22, a pointing device such as a mouse and optionally a scanner 24 all coupled to various ports of the computer system 12 via appropriate interfaces and software drivers (not shown). The computer system 12 can operate under a Microsoft Windows operating system although other systems could alternatively be used.

Resident on the mass storage element 16 is narration software 30 that controls the narration of an electronic document stored on the computer 12 (e.g., controls generation of speech and/or audio that is associated with (e.g., narrates) text in a document). Narration software 30 includes an edit software 30a that allows a user to edit a document and assign one or more voices or audio recordings to text (e.g., sequences of words) in the document and can include playback software 30b that reads aloud the text from the document, as the text is displayed on the computer's monitor 20 during a playback mode.

Text is narrated by the narration software 30 using several possible technologies: text-to-speech (TTS); audio recording of speech; and possibly in combination with speech, audio recordings of music (e.g., background music) and sound effects (e.g., brief sounds such as gunshots, door slamming, tea kettle boiling, etc.). The narration software 30 controls generation of speech, by controlling a particular computer voice (or audio recording) stored on the computer 12, causing that voice to be rendered through the computer's speakers 22. Narration software often uses a text-to-speech (TTS) voice which artificially synthesizes a voice by converting normal language text into speech. TTS voices vary in quality and naturalness. Some TTS voices are produced by synthesizing the sounds for speech using rules in a way which results in a voice that sounds artificial, and which some would describe as robotic. Another way to produce TTS voices concatenates small parts of speech which were recorded from an actual person. This concatenated TTS sounds more natural. Another way to narrate, other than TTS, is to play an audio recording of a person reading the text, such as, for example, a book on tape recording. The audio recording may include more than one actor speaking, and may include other sounds besides speech, such as sound effects or background music. Additionally, the computer voices can be associated with different languages (e.g., English, French, Spanish, Cantonese, Japanese, etc).

In addition, the narration software 30 permits the user to select and optionally modify a particular voice model which defines and controls aspects of the computer voice, including for example, the speaking speed and volume. The voice model includes the language of the computer voice. The voice model may be selected from a database that includes multiple voice models to apply to selected portions of the document. A voice model can have other parameters associated with it besides the voice itself and the language, speed and volume, including, for example, gender (male or female), age (e.g. child or adult), voice pitch, visual indication (such as a particular color of highlighting) of document text that is associated with this voice model, emotion (e.g. angry, sad, etc.), intensity (e.g. mumble, whisper, conversational, projecting voice as at a party, yell, shout). The user can select different voice models to apply to different portions of text such that when the system 10 reads the text the different portions are read using the different voice models. The system can also provide a visual indication, such as highlighting, of which portions are associated with which voice models in the electronic document.

Figure 2:
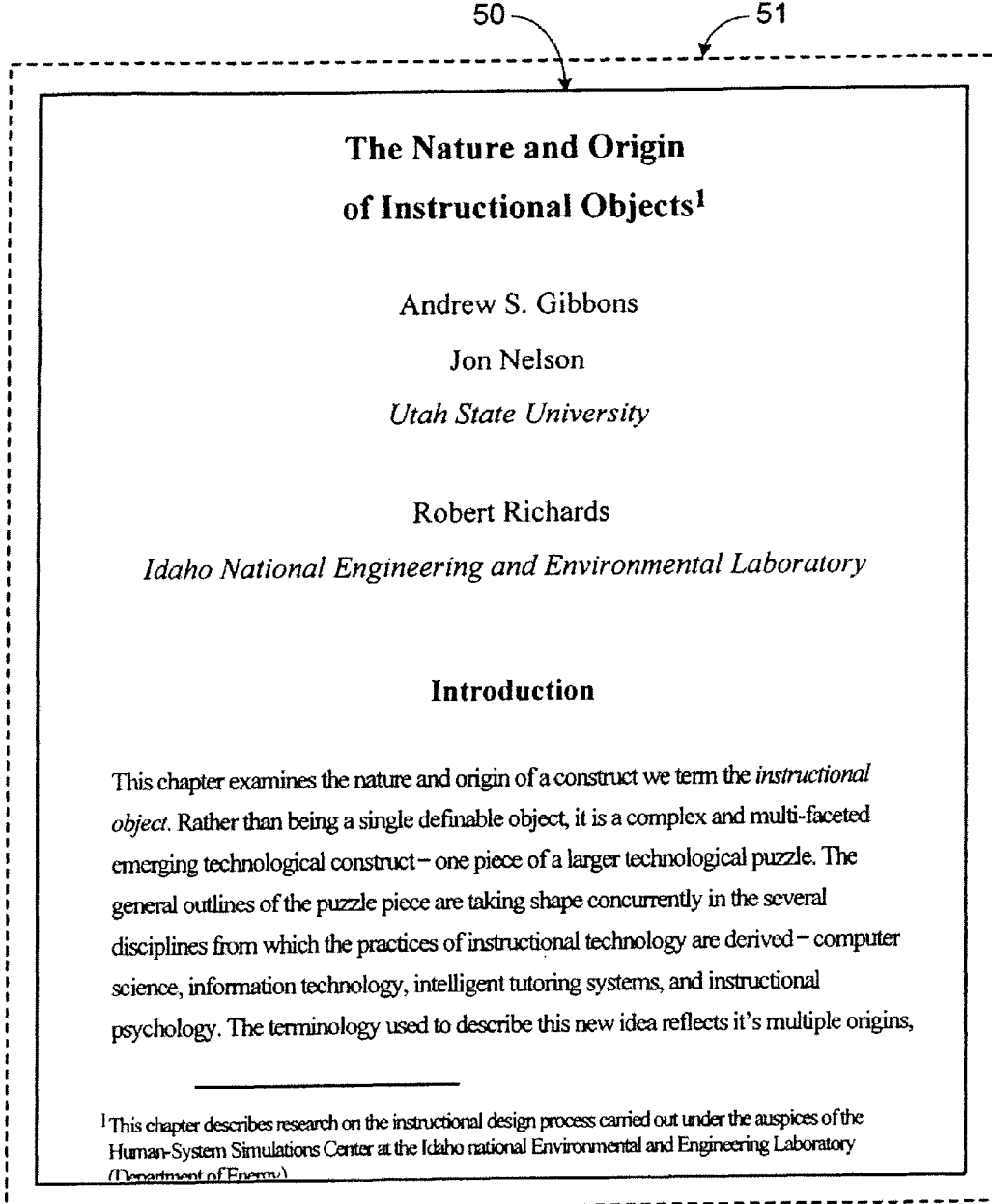
FIG. 2 is a screenshot depicting text.

Referring to FIG. 2, text 50 is rendered on a user display 51. As shown, the text 50 includes only words and does not include images. However, in some examples, the text could include portions that are composed of images and portions that are composed of words. The text 50 is a technical paper, namely, "The Nature and Origin of Instructional Objects." Exemplary texts include but not limited to electronic versions of books, word processor documents, PDF files, electronic versions of newspapers, magazines, fliers, pamphlets, menus, scripts, plays, and the like. The system 10 can read the text using one or more stored voice models. In some examples, the system 10 reads different portions of the text 50 using different voice models. For example, if the text includes multiple characters, a listener may find listening to the text more engaging if different voices are used for each of the characters in the text rather than using a single voice for the entire narration of the text. In another example, extremely important or key points could be emphasized by using a different voice model to recite those portions of the text.

As used herein a "character" refers to an entity and is typically stored as a data structure or file, etc. on computer storage media and includes a graphical representation, e.g., picture, animation, or another graphical representation of the entity and which may in some embodiments be associated with a voice model. A "mood" refers to an instantiation of a voice model according to a particular "mood attribute" that is desired for the character. A character can have multiple associated moods. "Mood attributes" can be various attributes of a character. For instance, one attribute can be "normal," other attributes include "happy," "sad," "tired," "energetic," "fast talking," "slow talking," "native language," "foreign language," "hushed voice "loud voice," etc. Mood attributes can include varying features such as speed of playback, volumes, pitch, etc. or can be the result of recording different voices corresponding to the different moods.

For example, for a character, "Homer Simpson" the character includes a graphical depiction of Homer Simpson and a voice model that replicates a voice associated with Homer Simpson. Homer Simpson can have various moods, (flavors or instantiations of voice models of Homer Simpson) that emphasize one or more attributes of the voice for the different moods. For example, one passage of text can be associated with a "sad" Homer Simpson voice model, whereas another a "happy" Homer Simpson voice model and a third with a "normal" Homer Simpson voice model.

Figure 3:
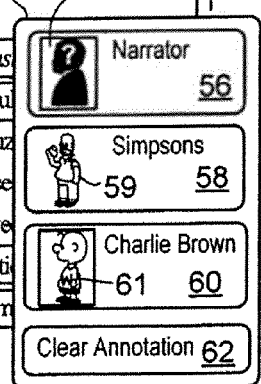
FIG. 3 is a screenshot of text that includes highlighting of portions of the text based on a narration voice.

Referring to FIG. 3, the text 50 is rendered on a user display 51 with the addition of a visual indicium (e.g., highlighting) on different portions of the text (e.g., portions 52, 53, and 54). The visual indicium (or lack of a indicium) indicates portions of the text that have been associated with a particular character or voice model. The visual indicium is in the form of, for example, a semi-transparent block of color over portions of the text, a highlighting, a different color of the text, a different font for the text, underlining, italicizing, or other visual indications (indicia) to emphasize different portions of the text. For example, in text 50 portions 52 and 54 are highlighted in a first color while another portion 53 is not highlighted. When the system 10 generates the narration of the text 50, different voice models are applied to the different portions associated with different characters or voice models that are represented visually by the text having a particular visual indicia. For example, a first voice model will be used to read the first portions 52 and 54 while a second voice model (a different voice model) will be used to read the portion 53 of the text.

In some examples, text has some portions that have been associated with a particular character or voice model and others that have not. This is represented visually on the user interface as some portions exhibiting a visual indicium and others not exhibiting a visual indicium (e.g., the text includes some highlighted portions and some non-highlighted portions). A default voice model can be used to provide the narration for the portions that have not been associated with a particular character or voice model (e.g., all non-highlighted portions). For example, in a typical story much of the text relates to describing the scene and not to actual words spoken by characters in the story. Such non-dialog portions of the text may remain non-highlighted and not associated with a particular character or voice model. These portions can be read using the default voice (e.g., a narrator's voice) while the dialog portions may be associated with a particular character or voice model (and indicated by the highlighting) such that a different, unique voice is used for dialog spoken by each character in the story.

FIG. 3 also shows a menu 55 used for selection of portions of a text to be read using different voice models. A user selects a portion of the text by using an input device such as a keyboard or mouse to select a portion of the text, or, on devices with a touchscreen, a finger or stylus pointing device may be used to select text. Once the user has selected a portion of the text, a drop down menu 55 is generated that provides a list of the different available characters (e.g., characters 56, 58, and 60) that can be used for the narration. A character need not be related directly to a particular character in a book or text, but rather provides a specification of the characteristics of a particular voice model that is associated with the character. For example, different characters may have male versus female voices, may speak in different languages or with different accents, may read more quickly or slowly, etc. The same character can be associated with multiple different texts and can be used to read portions of the different texts.

Each character 56, 58, and 60 is associated with a particular voice model and with additional characteristics of the reading style of the character such as language, volume, speed of narration. By selecting (e.g., using a mouse or other input device to click on) a particular character 56, 58, or 60, the selected portion of the text is associated with the voice model for the character and will be read using the voice model associated with the character.

Additionally, the drop down menu includes a "clear annotation" button 62 that clears previously applied highlighting and returns the portion of text to non-highlighted such that it will be read by the Narrator rather than one of the characters. The Narrator is a character whose initial voice is the computer's default voice, though this voice can be overridden by the user. All of the words in the document or text can initially all be associated with the Narrator. If a user selects text that is associated with the Narrator, the user can then perform an action (e.g. select from a menu) to apply another one of the characters for the selected portion of text. To return a previously highlighted portion to being read by the Narrator, the user can select the "clear annotation" button 62.

In order to make selection of the character more user friendly, the drop down menu 55 can include an image (e.g., images 57, 59, and 61) of the character. For example, one of the character voices can be similar to the voice of the Fox television cartoon character Homer Simpson (e.g., character 58), an image of Homer Simpson (e.g., image 59) could be included in the drop down menu 55. Inclusion of the images is believed to make selection of the desired voice model to apply to different portions of the text more user friendly.

Figure 4:
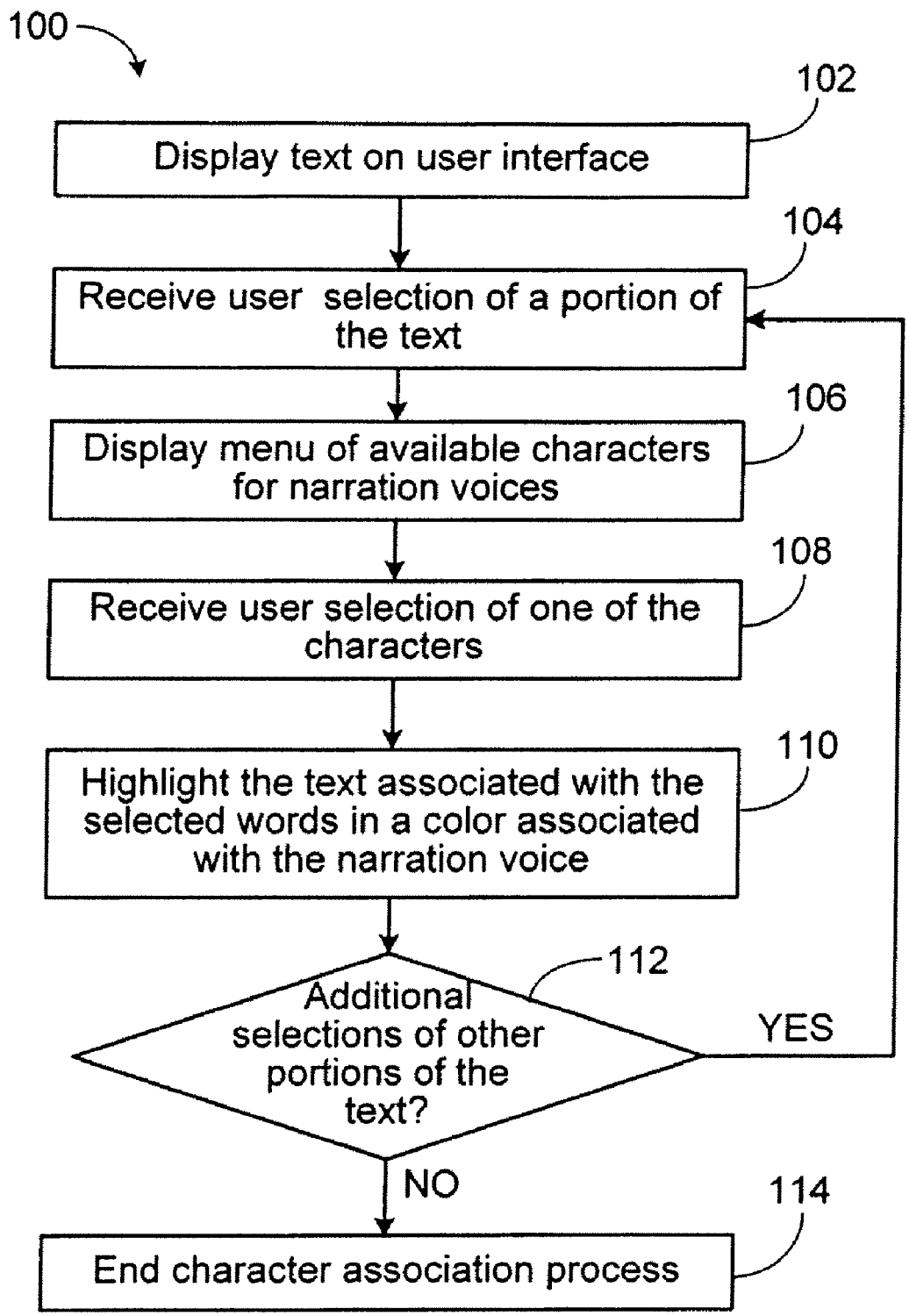
FIG. 4 is a flow chart of a voice painting process.

Referring to FIG. 4 a process 100 for selecting different characters or voice models to be used when the system 10 reads a text is shown. The system 10 displays 102 the text on a user interface. In response to a user selection, the system 10 receives 104 a selection of a portion of the text and displays 106 a menu of available characters each associated with a particular voice model. In response to a user selecting a particular character (e.g., by clicking on the character from the menu), the system receives 108 the user selected character and associates the selected portion of the text with the voice model for the character. The system 10 also generates a highlight 110 or generates some other type of visual indication to apply to that the portion of the text and indicate that that portion of text is associated with a particular voice model and will be read using the particular voice model when the user selects to hear a narration of the text. The system 10 determines 112 if the user is making additional selections of portions of the text to associate with particular characters. If the user is making additional selections of portions of the text, the system returns to receiving 104 the user's selection of portions of the text, displays 106 the menu of available characters, receives a user selection and generates a visual indication to apply to a subsequent portion of text.

As described above, multiple different characters are associated with different voice models and a user associates different portions of the text with the different characters. In some examples, the characters are predefined and included in a database of characters having defined characteristics. For example, each character may be associated with a particular voice model that includes parameters such as a relative volume, and a reading speed. When the system 10 reads text having different portions associated with different characters, not only can the voice of the characters differ, but other narration characteristics such as the relative volume of the different characters and how quickly the characters read (e.g., how many words per minute) can also differ.

In some embodiments, a character can be associated with multiple voice models. If a character is associated with multiple voice models, the character has multiple moods that can be selected by the user. Each mood has an associated (single) voice model. When the user selects a character the user also selects the mood for the character such that the appropriate voice model is chosen. For example, a character could have multiple moods in which the character speaks in a different language in each of the moods. In another example, a character could have multiple moods based on the type of voice or tone of voice to be used by the character. For example, a character could have a happy mood with an associated voice model and an angry mood using an angry voice with an associated angry voice model. In another example, a character could have multiple moods based on a story line of a text. For example, in the story of the Big Bad Wolf, the wolf character could have a wolf mood in which the wolf speaks in a typical voice for the wolf (using an associated voice model) and a grandma mood in which the wolf speaks in a voice imitating the grandmother (using an associated voice model).

Figure 5:
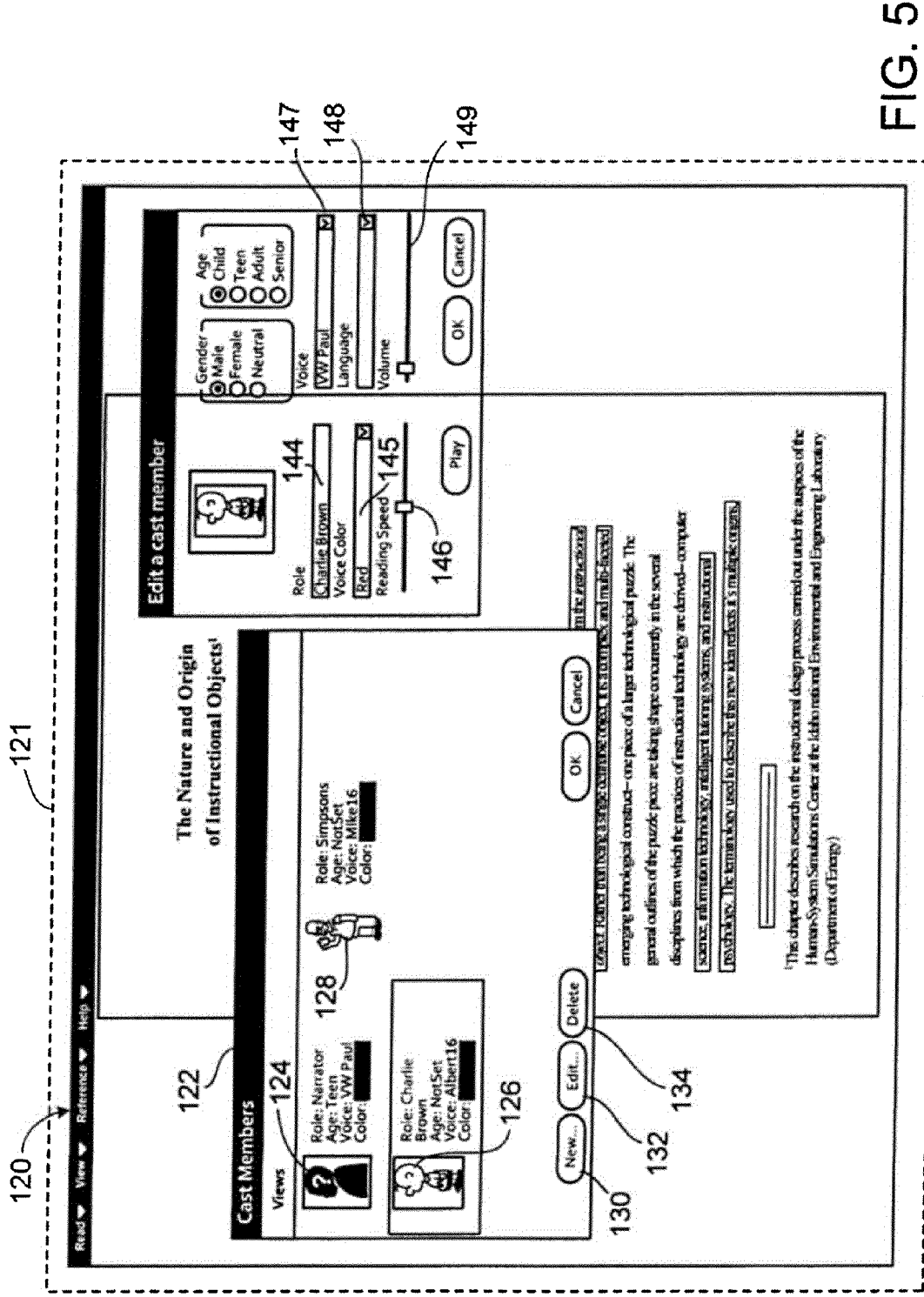
FIG. 5 is a screenshot of a character addition process.

FIG. 5 shows a screenshot of a user interface 120 on a user display 121 for enabling a user to view the existing characters and modify, delete, and/or generate a character. With the interface, a user generates a cast of characters for the text. Once a character has been generated, the character will be available for associating with portions of the text (e.g., as discussed above). A set of all available characters is displayed in a cast members window 122. In the example shown in FIG. 5, the cast members window 122 includes three characters, a narrator 124, Charlie Brown 126, and Homer Simpson 128. From the cast members window 122 the user can add a new character by selecting button 130, modify an existing character by selecting button 132, and/or delete a character by selecting button 134.

The user interface for generating or modifying a voice model is presented as an edit cast member window 136. In this example, the character Charlie Brown has only one associated voice model to define the character's voice, volume and other parameters, but as previously discussed, a character could be associated with multiple voice models (not shown in FIG. 5). The edit cast member window 136 includes an input portion 144 for receiving a user selection of a mood or character name. In this example, the mood of Charlie Brown has been input into input portion 144. The character name can be associated with the story and/or associated with the voice model. For example, if the voice model emulates the voice of an elderly lady, the character could be named "grandma."

In another example, if the text which the user is working on is Romeo and Juliet, the user could name one of the characters Romeo and another Juliet and use those characters to narrate the dialog spoken by each of the characters in the play. The edit cast member window 136 also includes a portion 147 for selecting a voice to be associated with the character. For example, the system can include a drop down menu of available voices and the user can select a voice from the drop down menu of voices. In another example, the portion 147 for selecting the voice can include an input block where the user can select and upload a file that includes the voice. The edit cast member window 136 also includes a portion 145 for selecting the color or type of visual indicia to be applied to the text selected by a user to be read using the particular character. The edit cast member window 136 also includes a portion 149 for selecting a volume for the narration by the character.

As shown in FIG. 5, a sliding scale is presented and a user moves a slider on the sliding scale to indicate a relative increase or decrease in the volume of the narration by the corresponding character. In some additional examples, a drop down menu can include various volume options such as very soft, soft, normal, loud, very loud. The edit cast member window 136 also includes a portion 146 for selecting a reading speed for the character. The reading speed provides an average number of words per minute that the computer system will read at when the text is associated with the character. As such, the portion for selecting the reading speed modifies the speed at which the character reads. The edit cast member window 136 also includes a portion 138 for associating an image with the character. This image can be presented to the user when the user selects a portion of the text to associate with a character (e.g., as shown in FIG. 3). The edit cast member window 136 can also include an input for selecting the gender of the character (e.g., as shown in block 140) and an input for selecting the age of the character (e.g., as shown in block 142). Other attributes of the voice model can be modified in a similar manner.

Figure 6:
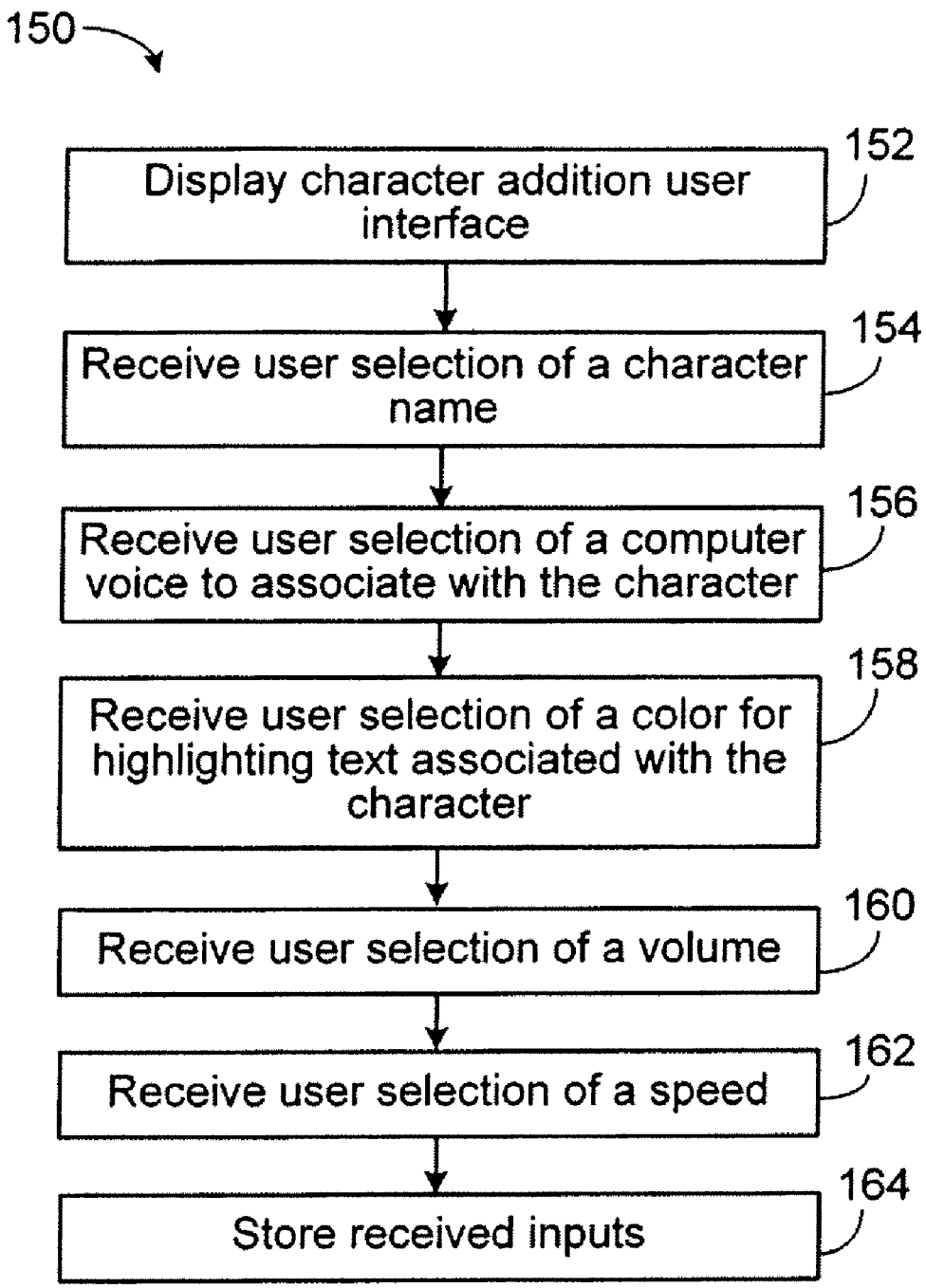
FIG. 6 is a flow chart of a character addition process.

Referring to FIG. 6, a process 150 for generating elements of a character and its associated voice model are shown. The system displays 152 a user interface for adding a character. The user inputs information to define the character and its associated voice model. While this information is shown as being received in a particular order in the flow chart, other orders can be used. Additionally, the user may not provide each piece of information and the associated steps may be omitted from the process 150.

After displaying the user interface for adding a character, the system receives 154 a user selection of a character name. For example, the user can type the character name into a text box on the user interface. The system also receives 156 a user selection of a computer voice to associate with the character. The voice can be an existing voice selected from a menu of available voices or can be a voice stored on the computer and uploaded at the time the character is generated. The system also receives 158 a user selection of a type of visual indicia or color for highlighting the text in the document when the text is associated with the character. For example, the visual indicium or color can be selected from a list of available colors which have not been previously associated with another character. The system also receives 160 a user selection of a volume for the character. The volume will provide the relative volume of the character in comparison to a baseline volume. The system also receives 162 a user selection of a speed for the character's reading. The speed will determine the average number of words per minute that the character will read when narrating a text. The system stores 164 each of the inputs received from the user in a memory for later use. If the user does not provide one or more of the inputs, the system uses a default value for the input. For example, if the user does not provide a volume input, the system defaults to an average volume.

Different characters can be associated with voice models for different languages. For example, if a text included portions in two different languages, it can be beneficial to select portions of the text and have the system read the text in the first language using a first character with a voice model in the first language and read the portion in the second language using a second character with a voice model in the second language. In applications in which the system uses a text-to-speech application in combination with a stored voice model to produce computer generated speech, it can be beneficial for the voice models to be language specific in order for the computer to correctly pronounce and read the words in the text.

For example, text can include a dialog between two different characters that speak in different languages. In this example, the portions of the dialog spoken by a character in a first language (e.g., English) are associated with a character (and associated voice model) that has a voice model associated with the first language (e.g., a character that speaks in English). Additionally, the portions of the dialog a second language (e.g., Spanish) are associated with a character (and associated voice model) speaks in the second language (e.g., Spanish). As such, when the system reads the text, portions in the first language (e.g., English) are read using the character with an English-speaking voice model and portions of the text in the second language (e.g., Spanish) are read using a character with a Spanish-speaking voice model.

For example, different characters with voice models can be used to read an English as a second language (ESL) text in which it can be beneficial to read some of the portions using an English-speaking character and other portions using a foreign language-speaking character. In this application, the portions of the ESL text written in English are associated with a character (and associated voice model) that is an English-speaking character. Additionally, the portions of the text in the foreign (non-English) language are associated with a character (and associated voice model) that is a character speaking the particular foreign language. As such, when the system reads the text, portions in English are read using a character with an English-speaking voice model and portions of the text in the foreign language are read using a character with a voice model associated with the foreign language.

While in the examples described above, a user selected portions of a text in a document to associate the text with a particular character such that the system would use the voice model for the character when reading that portion of the text, other techniques for associating portions of text with a particular character can be used. For example, the system could interpret text-based tags in a document as an indicator to associate a particular voice model with associated portions of text.

Figure 7:
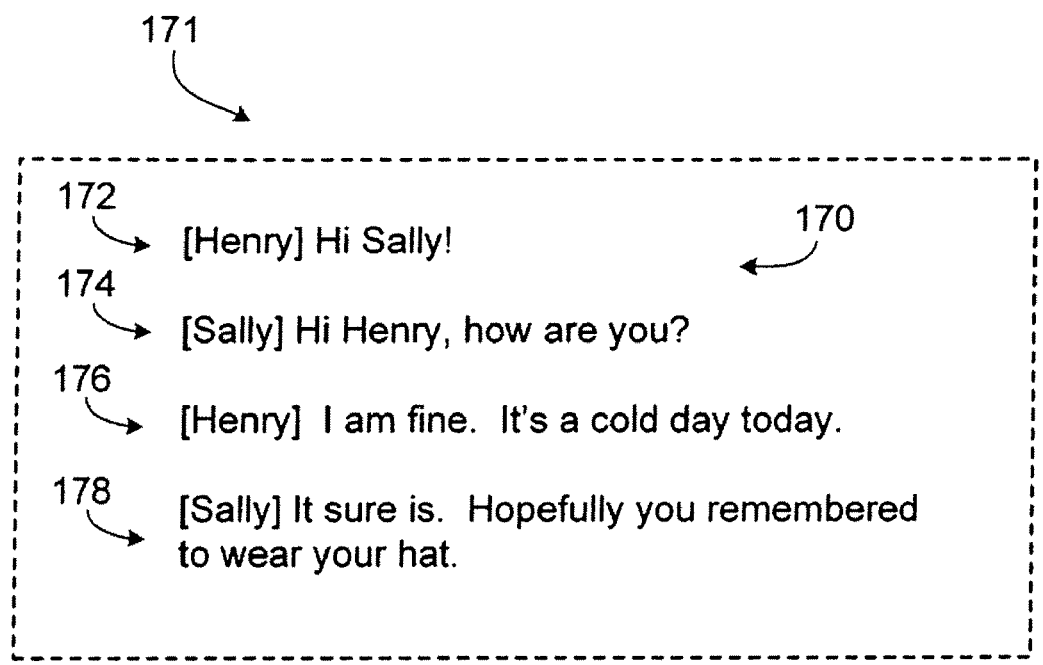
FIG. 7 is a diagram of text with tagged narration data.

Referring to FIG. 7, a portion of an exemplary document rendered on a user display 171 that includes text based tags is shown. Here, the actors names are written inside square braces (using a technique that is common in theatrical play scripts). Each line of text has a character name associated with the text. The character name is set out from the text of the story or document with a set of brackets or other computer recognizable indicator such as the pound key, an asterisks, parenthesis, a percent sign, etc. For example, the first line 172 shown in document 170 includes the text "[Henry] Hi Sally!" and the second line 174 includes the text "[Sally] Hi Henry, how are you?" Henry and Sally are both characters in the story and character models can be generated to associate a voice model, volume, reading speed, etc. with the character, for example, using the methods described herein. When the computer system reads the text of document 170, the computer system recognizes the text in brackets, e.g., [Henry] and [Sally], as an indicator of the character associated with the following text and will not read the text included within the brackets. As such, the system will read the first line "Hi Sally!" using the voice model associated with Henry and will read the second line "Hi Henry, how are you?" using the voice model associated with Sally.

Using the tags to indicate the character to associate with different portions of the text can be beneficial in some circumstances. For example, if a student is given an assignment to write a play for an English class, the student's work may go through multiple revisions with the teacher before reaching the final product. Rather than requiring the student to re-highlight the text each time a word is changed, using the tags allows the student to modify the text without affecting the character and voice model associated with the text. For example, in the text of FIG. 7, if the last line was modified to read, " . . . Hopefully you remembered to wear your gloves" from " . . . Hopefully you remembered to wear your hat." Due to the preceding tag of '[Sally]' the modified text would automatically be read using the voice model for Sally without requiring the user to take additional steps to have the word "gloves" read using the voice model for Sally.

Figure 8:
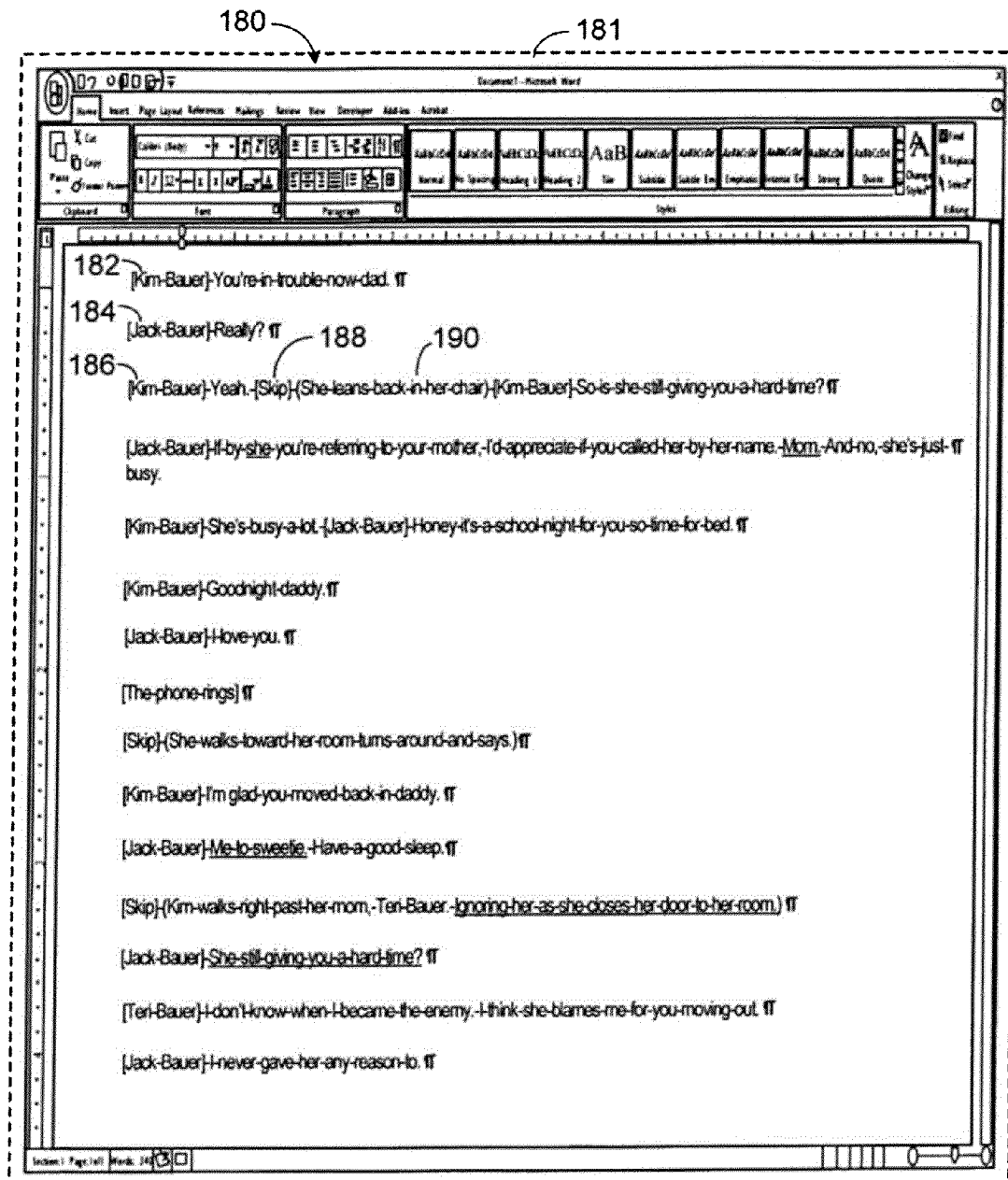
FIG. 8 is a screenshot of text with tagged narration information.

Referring to FIG. 8, a screenshot 180 rendered on a user display 181 of text that includes tagged portions associated with different characters is shown. As described above, the character associated with a particular portion of the text is indicated in brackets preceding the text (e.g., as shown in bracketed text 182, 184 and 186). In some situations, a story may include additional portions that are not to be read as part of the story. For example, in a play, stage motions or lighting cues may be included in the text but should not be spoken when the play is read. Such portions are skipped by the computer system when the computer system is reading the text. A 'skip' indicator indicates portions of text that should not be read by the computer system. In the example shown in FIG. 8, a skip indicator 188 is used to indicate that the text "She leans back in her chair" should not be read.

While in the examples above, the user indicated portions of the text to be read using different voice models by either selecting the text or adding a tag to the text, in some examples the computer system automatically identifies text to be associated with different voice models. For example, the computer system can search the text of a document to identify portions that are likely to be quotes or dialog spoken by characters in the story. By determining text associated with dialog in the story, the computer system eliminates the need for the user to independently identify those portions.

Figure 9:
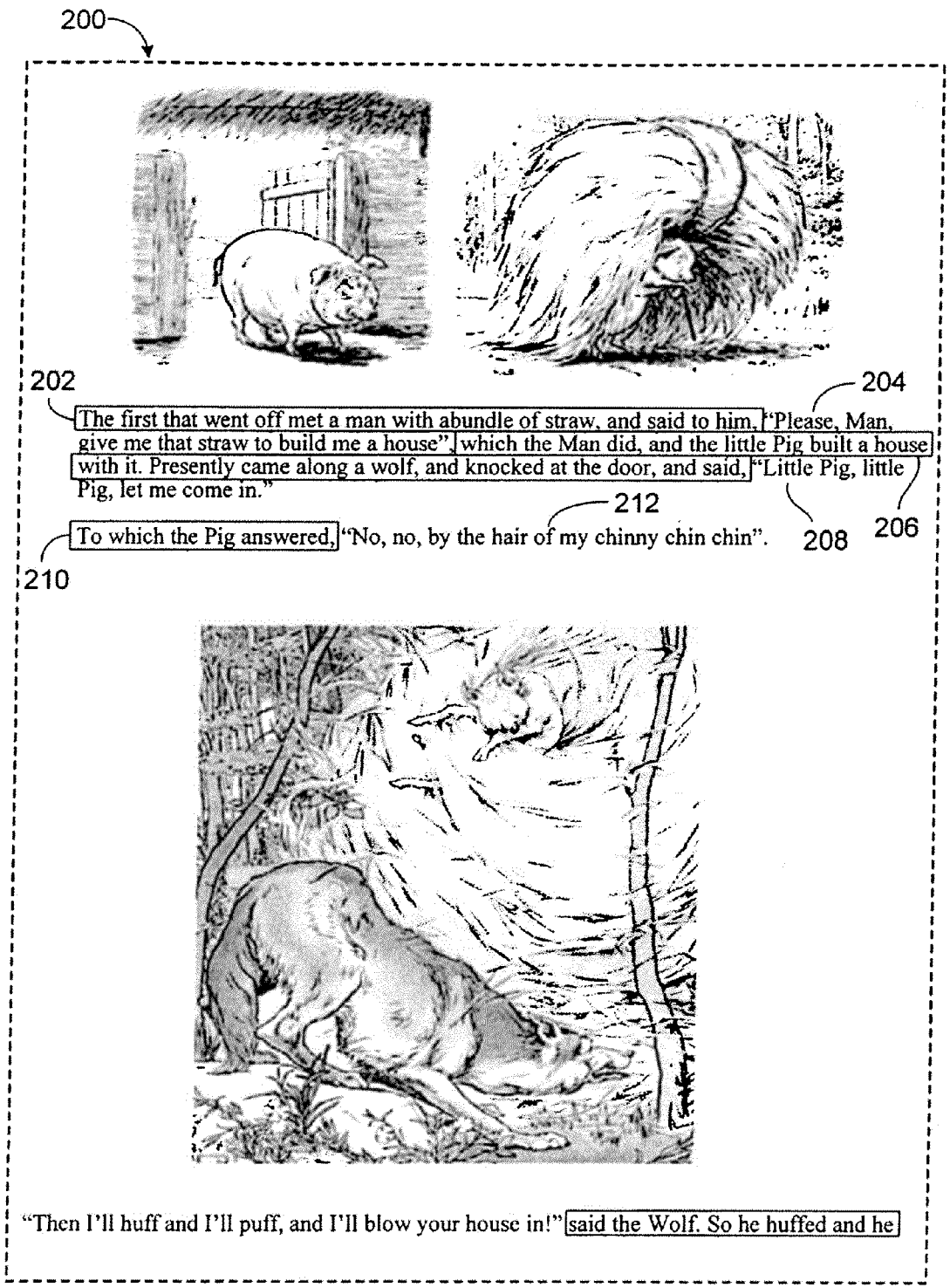
FIG. 9 is a diagram of text with highlighting.

Referring to FIG. 9, the computer system searches the text of a story 200 (in this case the story of the Three Little Pigs) to identify the portions spoken by the narrator (e.g., the non-dialog portions). The system associates all of the non-dialog portions with the voice model for the narrator as indicated by the highlighted portions 202, 206, and 210. The remaining dialog-based portions 204, 208, and 212 are associated with different characters and voice models by the user. By preidentifying the portions 204, 208, and 212 for which the user should select a character, the computer system reduces the amount of time necessary to select and associate voice models with different portions of the story.

In some examples, the computer system can step through each of the non-highlighted or non-associated portions and ask the user which character to associate with the quotation. For example, the computer system could recognize that the first portion 202 of the text shown in FIG. 9 is spoken by the narrator because the portion is not enclosed in quotations. When reaching the first set of quotations including the text "Please man give me that straw to build me a house," the computer system could request an input from the user of which character to associate with the quotation. Such a process could continue until the entire text had been associated with different characters.

In some additional examples, the system automatically selects a character to associate with each quotation based on the words of the text using a natural language process. For example, line 212 of the story shown in FIG. 9 recites "To which the pig answered 'no, not by the hair of my chinny chin chin.'" The computer system recognizes the quotation "no, not by the hair of my chinny chin chin" based on the text being enclosed in quotation marks. The system review the text leading up to or following the quotation for an indication of the speaker. In this example, the text leading up to the quotation states "To which the pig answered" as such, the system could recognize that the pig is the character speaking this quotation and associate the quotation with the voice model for the pig. In the event that the computer system selects the incorrect character, the user can modify the character selection using one or more of techniques described herein.

In some embodiments, the voice models associated with the characters can be electronic Text-To-Speech (TTS) voice models. TTS voices artificially produce a voice by converting normal text into speech. In some examples, the TTS voice models are customized based on a human voice to emulate a particular voice. In other examples, the voice models are actual human (as opposed to a computer) voices generated by a human specifically for a document, e.g., high quality audio versions of books and the like. For example, the quality of the speech from a human can be better than the quality of a computer generated, artificially produced voice. While the system narrates text out loud and highlights each word being spoken, some users may prefer that the voice is recorded human speech, and not a computer voice.

In order to efficiently record speech associated with a particular character, the user can pre-highlight the text to be read by the person who is generating the speech and/or use speech recognition software to associate the words read by a user to the locations of the words in the text. The computer system read the document pausing and highlighting the portions to be read by the individual. As the individual reads, the system records the audio. In another example, a list of all portions to be read by the individual can be extracted from the document and presented to the user. The user can then read each of the portions while the system records the audio and associates the audio with the correct portion of the text (e.g., by placing markers in an output file indicating a corresponding location in the audio file). Alternatively, the system can provide a location at which the user should read and the system can record the audio and associate the text location with the location in the audio (e.g., by placing markers in the audio file indicating a corresponding location in the document).

In "playback mode", the system synchronizes the highlighting (or other indicia) of each word with an audio recording of a person speaking the text so that each word is highlighted or otherwise visually emphasized on a user interface as it is being spoken (e.g., played on the audio output), in real time. Playback mode is different from the various types of document editing previously described. Playback mode is used by an end-user to read and listen to the text. Playback mode can be used, for example, when reading for pleasure or for educational purposes.

Figure 10:
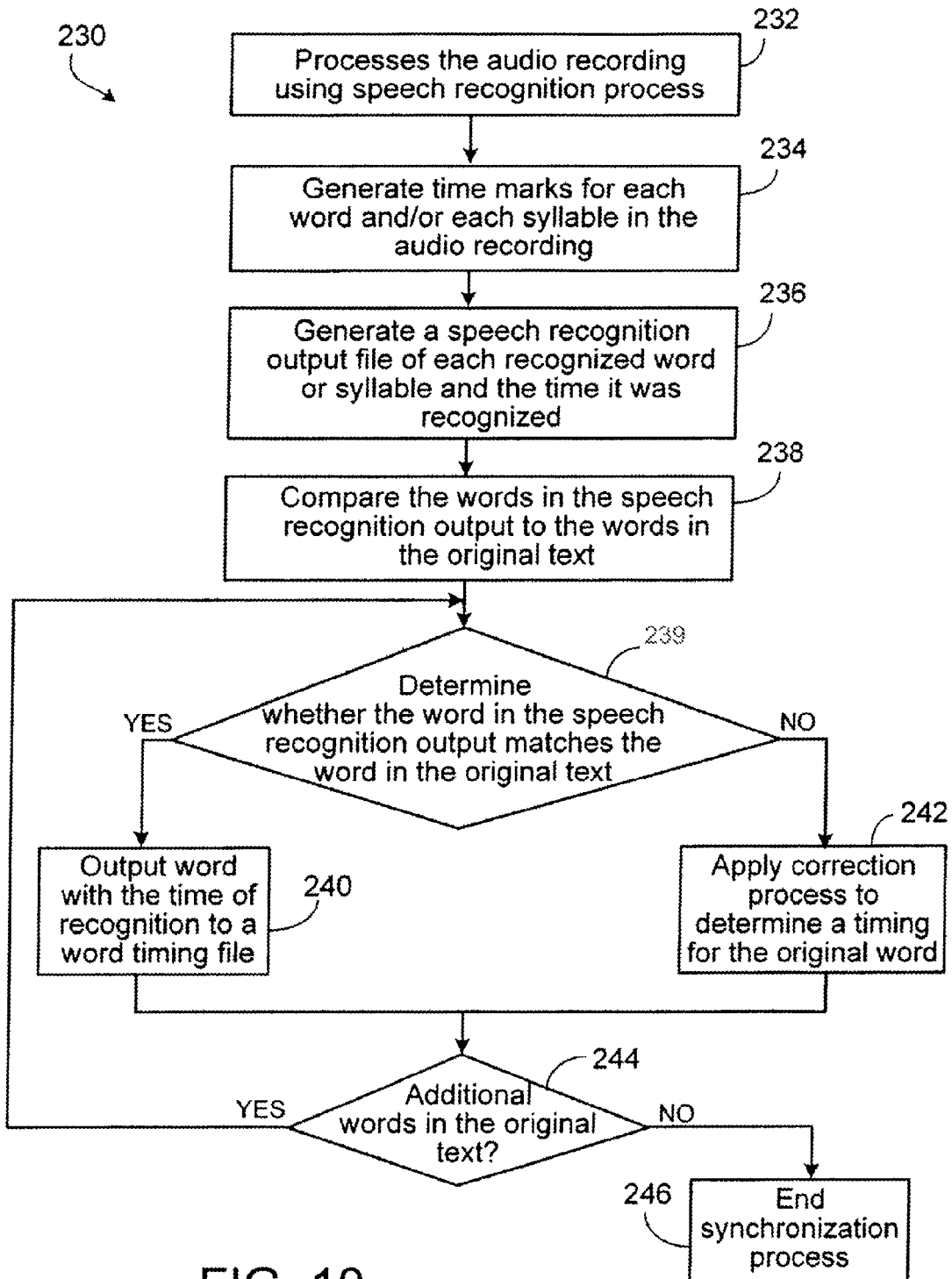
FIG. 10 is a flow chart of a synchronization process.

Referring to FIG. 10 a process 230 for synchronizing the highlighting (or other visual indicia) of each word in an audio recording with a set of expected words so that each word is visually emphasized on a user interface as it is being spoken (e.g., played on the audio output), is shown. The system processes 232 the audio recording using speech recognition processes executed on a computer. The system, using the speech recognition process, generates 234 a time mark (e.g., an indication of an elapsed time period from the start of the audio recording to each word in the sequence of words) for each word and/or each syllable, that the speech recognition process recognizes. The system, using the speech recognition process, generates 236 an output file of each recognized word or syllable and the time in the recording where it occurs, relative to the start time of the recording (e.g., the elapsed time). Other parameters and measurements can additionally be saved to the file.

The system compares 238 the words in the speech recognition output to the words in the original text (e.g., the expected text such as a set of expected words). The comparison process compares one word from the original text to the words in the speech recognition output at a time. Speech recognition is an imperfect process, so even with a high quality recording like an audio book, there may be errors of recognition. For each word, based on the comparison of the word in the speech recognition output to the expected word in the original text, the system determines 239 whether the word in the speech recognition output matches (e.g., is the same as) the expected word in the original text. If the expected word from the original text matches the recognized word, the word is output 240 with the time of recognition to a timing file. If the words do not match, the system applies 242 a correcting process to compute (or estimate) a timing for the original word. The system determines 244 if there are additional words in the original text, and if so, proceeds to the subsequent expected word in the original text and returns to determining 239 whether the word in the speech recognition output matches (e.g., is the same as) the word in the original text. If there are no additional words in the original text, the system ends 246 the synchronization process. Alternatively, the process can be done for other linguistic units besides words, e.g. syllables and phonemes, to provide highlighting for those linguistic units individually. For example, playback mode can have an option to highlight each individual syllable as it is spoken (e.g., played back from the audio recording), instead of words. Additionally, the process can be done for larger linguistic units such as clauses, sentences, or paragraphs, to provide highlighting for those linguistic units individually. For example, playback mode can have an option to highlight each phrase or sentence as it is spoken (e.g., played back from the audio recording)

There are a number of methods to compute the correct timing from the speech recognition process or to estimate a timing for the word. For example, a process that computes the correct timing can iteratively compare the next words until it finds a match between the original text and the recognized text, which leaves it with a known length of mismatched words (e.g., a mismatched portion of text). For example, suppose the original text (e.g., expected text) is "Customers buy a share in the farm" but the recognition returns "Customer's buyer sharing the farm." The word "Customers" matches, then there are some words that don't match, then "the farm" matches. The known length of mismatched words from the original text is "buy a share in". The process can, for example, interpolate the times to get a time that is in-between the first matched word and the last matched word in this length of mismatched words. In the previous example, the words "customers" and "the" match, and their times are available, so the times for the mismatched words between the matched words (e.g., buy a share in) could be interpolated or estimated to be some times between those of the matched words.

The process can use additional timing information from speech recognition. Speech recognition ordinarily provides timing information about sentences and words, but is capable of providing timing information about other linguistic units besides words, e.g., syllables and phonemes. The linguistic units (e.g., syllables or phonemes) for a word may be provided by speech recognition, and are also determined by referencing a dictionary of all the words in the language, which provides a way to reference (e.g., look up) all the words in a language, to determine their correct spelling, syllables, and other information. Dictionaries or other linguistic knowledge bases describe syllables, phonemes and other linguistic units for each word.

For example, using syllables, if the number of syllables matches in the length of mismatched words, the process assumes the syllable timings are correct, and sets the timing of the mismatched word according to the number of syllables. In the example above, the number of words differs, but the number of syllables is the same in the mismatched section: the expected text is "buy a share in" (4 words, 4 syllables) and the recognized text is "buy-er shar-ing" (2 words, 4 syllables). To compute the time for the expected word "buy", the time from the first syllable "buy-er" in the recognized text is used. For "a", use the $2^{nd}$ syllable in "buy-er", for "share" use the $1^{st}$ syllable from "shar-ing", and for "in" use $2^{nd}$ syllable from "shar-ing". As another example, suppose the expected word has several syllables, then the time from the first associated recognized syllable can be used as the elapsed time for the expected word, to ensure that the word is highlighted as soon as audio corresponding to the first syllable is spoken on the audio output.

Instead of using syllables, phonemes or other linguistic units can be used in the same manner. In general, the system computes the elapsed time information for each word by trying to match each expected/original word to the associated recognized word. If the word matches, the time from that word is used. If a length of mismatched words is found, the same kind of matching process can be applied, using other kinds of text units such as syllables or phonemes. Generally the text units would be finer than a word, that is, a word is composed of one or more of the units, just as a word is composed of one or more syllables, but it is not the case that a single syllable is composed of (or represents or communicates) several words (at least in English).

Another technique involves using linguistic metrics based on measurements of the expected length of time to speak words, syllables, letters and other parts of speech. For example, consider a word timing knowledge base that contains the expected length of time to speak each word, relative to the time it takes to speak a chosen standard word or part of speech. To compute the length of time to speak a word (e.g., play the word on the audio output), the rate of speech is also required (e.g., the speed of speech, which can be expressed in words per second or another measure of rate such as syllables per second). To compute the length of time to speak, for example, a particular word, multiply the speech rate (e.g. words per second) by the relative speaking time for the particular word (e.g. the ratio between the particular word and a standard word). These metrics can be applied to the original word to obtain an estimate for the time needed to speak that word.

Alternatively, a word timing indicator can be produced by close integration with a speech recognizer. Speech recognition is a complex process which generates many internal measurements, variables and hypotheses. Using these very detailed speech recognition measurements in conjunction with the original text (the text that is known to be spoken) could produce highly accurate hypotheses about the timing of each word. The techniques described above could be used; but with the additional information from the speech recognition engine, in some examples, better results may be achieved. The speech recognition engine would become a part of the word timing indicator, in this example.

A process that computes the elapsed time information using finer text units can be described as follows. The process matches the expected and recognized text using a large text unit (e.g., words). The recognized text is generated by applying speech recognition to an audio recording, which generates recognized words. For each recognized word, an elapsed time from a reference time in the recording is determined. The process compares each word in the recognized text to each word in an expected text, which should ideally match word by word; however, due to imperfections in speech recognition or in the speech itself, there may be mismatched portions of text. The purpose of this process is to provide timing information for the expected text in the mismatched portions of text, so that, e.g., those portions will have visual indicia that matches the imperfectly recognized audio recording.

The process determines the finer linguistic units (e.g., syllables) that compose each recognized word. The finer linguistic units may be provided by speech recognition: some speech recognizers are capable of computing and providing the syllables, phonemes and other finer linguistic units of each word that they recognize. Alternatively, a dictionary or other linguistic knowledge base can be referenced to obtain the finer linguistic unit for each word.

The process computes a timing for each recognized finer linguistic unit, which may be provided by speech recognition, just as it provided a timing for each recognized word. Alternatively, the process uses a metric, for example, that all syllables take the same amount of time to speak. Other metrics can be used, such as to count the number of letters to compute the relative time based on the number of letters. The process computes the time to speak each word, by subtracting the elapsed time for the next word from the current word. Assuming that all syllables take the same amount of time to speak, the time to speak a particular syllable is computed from its proportion of the time to speak the word that includes the particular syllable. The elapsed time for the first syllable of a word, for example, is computed by adding the computed time to speak that syllable to the computed elapsed time for the previous word in the expected text. To compute the elapsed time for the second syllable of a word, for example, add the computed time for the second syllable to the elapsed time of the first syllable, and so on for each subsequent syllables of the word.

Alternatively, the process references a knowledge base which provides relative timing information for each possible linguistic unit in the language (relative to a standard word or linguistic unit), obtains the relative times for each recognized finer linguistic unit in a recognized word, and computes a time ratio. For example, suppose the recognized word is "sharing". Referencing the knowledge base, suppose "shar-"

has a relative time of 70, and "-ing" has 30. Therefore, "shar-" takes 70/(70+30) or 70% of the time to speak "sharing", and "-ing" takes 30/100 or 30% of the time to speak "sharing".

The process determines the linguistic units that compose each expected word by referencing a dictionary or other linguistic knowledge base. Once the linguistic units for both the recognized and expected text have been determined, the process compares and associates each recognized linguistic unit with an expected linguistic unit. If the number of recognized and expected linguistic units is the same in the portion of text being processed, then they can simply be associated one by one in the order that they appear. If the number differs, then a matching process analyzes the texts to determine matching linguistic units and possible extra text. In some examples, the matching process can repeat the analysis with different and/or finer linguistic units. The process can also mark portions of the recognized or expected text as mismatched sections.

With the timing for each recognized text unit and the correspondence between each expected text unit and one or more recognized text units available, the system computes or determines the timing for each expected text unit using the corresponding recognized text unit, if there is only one corresponding text unit. If there is more than one, then the times for the corresponding recognized text units are combined to provide a timing for the recognized text unit.

Finally, the elapsed time for each expected word or other larger text unit is computed by combining the computed times of the finer expected text units that compose the particular word.

Additionally, methods of determining the timings of each word could be facilitated by a software tool that provides a user with a visual display of the recognized words, the timings, the original words and other information, for example, in a timeline display. Based on the display, the user could make an educated guess as to the timings of each word using the information on the display. This software tool provides the user with an interface for the user to change the timing information of any word, and to otherwise manipulate and correct the timing file. The software tool may also provide audio playback of a section of the audio file associated with the corrected word timings, so the user can test the timings and make further corrections if desired.

Other associations between the location in the audio file and the location in the document can be used. For example, such an association could be stored in a separate file from both the audio file and the document, in the audio file itself, and/or in the document.

In some embodiments, the methods of computing the elapsed time information of text units described herein can be used in combination. For example, timings from syllables can be used for portions of text where the number of syllables match, and then the method of interpolation can be used for mismatched sections where the number of syllables does not match.

Based on the determined timings, during playback mode, audio is played that corresponds to the text that is displayed (and sometimes visually indicated or emphasized) on a user interface. More particularly, the system computes elapsed time information for the displayed (expected) text using one or more of the methods described herein, and the system uses this time information to show text on the user interface that corresponds to the words that are currently playing on the audio output (e.g., being spoken in the audio output). The system also provides visual indicia for the text whose associated audio is currently playing on the audio output.

In general, during playback, the system plays an audio recording and the expected text corresponding to the portion of the audio currently being played is rendered on a display device (e.g., an entire page of text can be displayed on a computer monitor). The display shows visual indicia (e.g., highlighting) on the portion of expected text that is computed to be currently being spoken on the audio output. An ordinary example of this is to highlight a single word when that word is being spoken (e.g., played on the audio output), then when the next word is spoken, to highlight that word, and so on. The text on the user interface is ordinarily the text that is expected to be currently being spoken on the audio output (the "expected text"). The display may scroll or show a new page in order to continuously show the expected text that is currently being spoken on the audio output. The expected text may differ from the text output from speech recognition (the "recognized text"), because speech recognition is an imperfect process, because of poor quality audio, reading errors when generating the audio, imperfect transcription, and other issues. When expected text is different from recognized text, a mismatched portion of text can be identified, as described above, and the mismatched portion from the expected text has an associated portion from the recognized text, which is different. When the recognized mismatched portion is compared to the expected mismatched portion, the comparison result can be classified into one of the following three types:

1) The number of linguistic units (e.g., words, syllables, phonemes) is the same between the recognized and expected portions. If the number of words is the same, one method of generating timing information is to use the timing from the associated recognized word for the expected word (even though it is a different word). If the number of words is different, but the number of some other linguistic unit (e.g., syllables) is the same, then the timings from the linguistic unit can be used (e.g., previously, an example of this situation using syllables was described).

2) There is more expected text in the mismatched portion than recognized text. For example, suppose the expected text is "Jane walked and talked", and the recognized text is "Jane talked." The methods described herein will generate timing information for "Jane" so it is properly highlighted during playback. The word "talked" matches, so timing information is generated for that word. For the extra text "walked and", there are several options: a) do not provide visual indicia b) generate audio output with TTS, instead of playing the audio recording. Other options are possible.

3) There is more recognized text than expected text. For example, suppose the expected text is "Hello Sam" and the recognized text is "Hello oops I dropped my coffee Sam". The methods described herein will generate timing information for "Hello" and "Sam" so they are properly highlighted during playback. For the additional text "oops I dropped my coffee", there are several options, including at least: a) keep visual indicia active on the previous word "Hello" until it is time to speak the next expected word "Sam" (in this case the previous matched word "Hello" is considered part of the mismatched portion), or b) turn off all visual indicia while the audio output is speaking the extra recognized text. Other options are possible.

In some examples, based on the categories described above, if the recognized and expected text match, then the system uses the timing information to make the visual indicia for the displayed text correspond to the text that is currently audible. If they don't match, some portion of the mismatched text may have visual indicia, as described above, or alternatively, no visual indicia during the time when the mismatched portion is audible (for example in the case where all of the mismatched portion is in the recognized text and so is not part of the displayed text).

In playback mode, reading sometimes begins at the beginning of the document (e.g., the first word in the document) and proceeds continuously from that point. However, the reading can begin at a selected location other than the beginning of the document. To support initiation of the reading at a location other than the beginning of the document, the reading system allows the user to indicate a portion of text in the document to begin or resume playback. The system includes play and stop controls that allows the user to indicate when to start and stop reading (for example, a play button and a stop button). The system is configurable to interpret other user input, including user selection of a different portion of the text, as an indication to stop (or start) playback.

A user makes an indication of a portion of text on a user interface device by using an input device such as a keyboard or mouse to select a portion of the text. On devices with a touchscreen, a finger or stylus pointing device may be used to select text. In playback mode, if a user selects a portion of text such as a word or sequence of words, the system begins playback at the first word in the user-selected portion and reads continuously from that point. Playback stops when the user inputs a command to the system to stop (e.g., by pressing a stop button), when the system reaches the end of the document, when the system reaches at the end of the user selected portion of the document, or as the system is configured. For example, the system may be configured to play back a single paragraph and then stop reading. In other examples, the system may be configured to play back a single syllable, word, sentence, page, or other part of speech or reading unit. The system may also be configured to playback only the text that the user has selected. The system has various options to set these types of configurations, and modes that affect reading.

The user interface allows the user to indicate a point in the text. For example, the system displays a visual indicium (e.g., a blinking cursor) and the user selects a location in the text by positioning the visual indicium at a desired location in the text. In this case, the system interprets the portion of text that is selected for playback to be the portion of text, which follows the user-selected point in text. As such, play back begins at that word.

As previously described, a portion of text is marked to be read aloud either by a particular TTS voice (e.g., a default voice or user selected voice) or by playing an audio recording. A single document can contain one portion of text marked for TTS and another portion marked for an audio recording. When the system begins reading a portion of text, and the portion is marked for TTS, the system presents the text to be read to the TTS engine, which will produce speech from the text. When the system begins reading a portion of text marked for an audio recording, the system references the timing file (described above) for the portion of text to find the point in the audio recording. The system then plays the audio recording starting at that point. The system allows the user to play portions of the audio in any "random" order, for example, the user could indicate to the system to play audio from page 10 of a document, let the system playback one sentence, then pause and select a sentence from page 5, and playback that sentence.

In some additional examples, a second type of highlighting, referred to herein as "playback highlighting," is displayed by the system during playback of a text in order to annotate the text and provide a reading location for the user. This playback highlighting occurs in a playback mode of the system and is distinct from the highlighting that occurs when a user selects text, or the voice painting highlighting that occurs in an editing mode used to highlight sections of the text according to an associated voice model. In this playback mode, for example, as the system reads the text (e.g., using a TTS engine or by playing stored audio), the system tracks the location in the text of the words currently being spoken on the audio output. The system highlights or applies another visual indicia (e.g., bold font, italics, underlining, a moving ball or other pointer, change in font color) on a user interface to allow a user to more easily read along with the system. One example of a useful playback highlighting mode is to highlight each word (and only that word) as it is being spoken on the audio output. The system plays back and reads aloud any text in the document, including, for example, the main story of a book, footnotes, chapter titles and also user-generated text notes that the system allows the user to type in. However, as noted herein, some sections or portions of text may be skipped, for example, the character names inside text tags, text indicated by use of the skip indicator, and other types of text as allowed by the system.

In some examples, the text can be rendered as a single document with a scroll bar or page advance button to view portions of the text that do not fit on a current page view, for example, text such as a word processor (e.g., Microsoft Word), document, a PDF document, or other electronic document. In some additional examples, the two-dimensional text can be used to generate a simulated three-dimensional book view as shown in FIG. 11.

Figure 11:
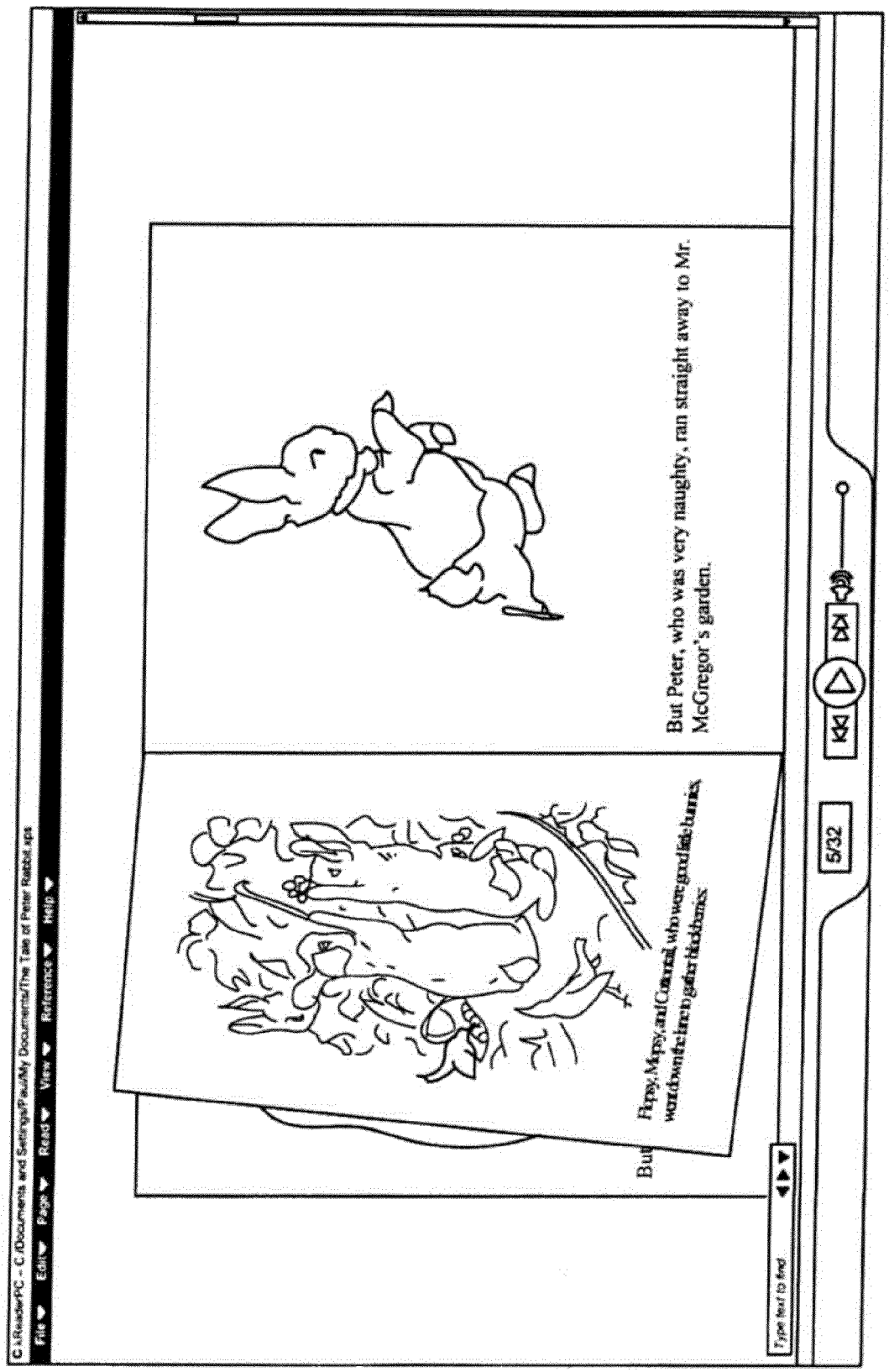
FIG. 11 is a screenshot of a book view of text.
Figure 12:
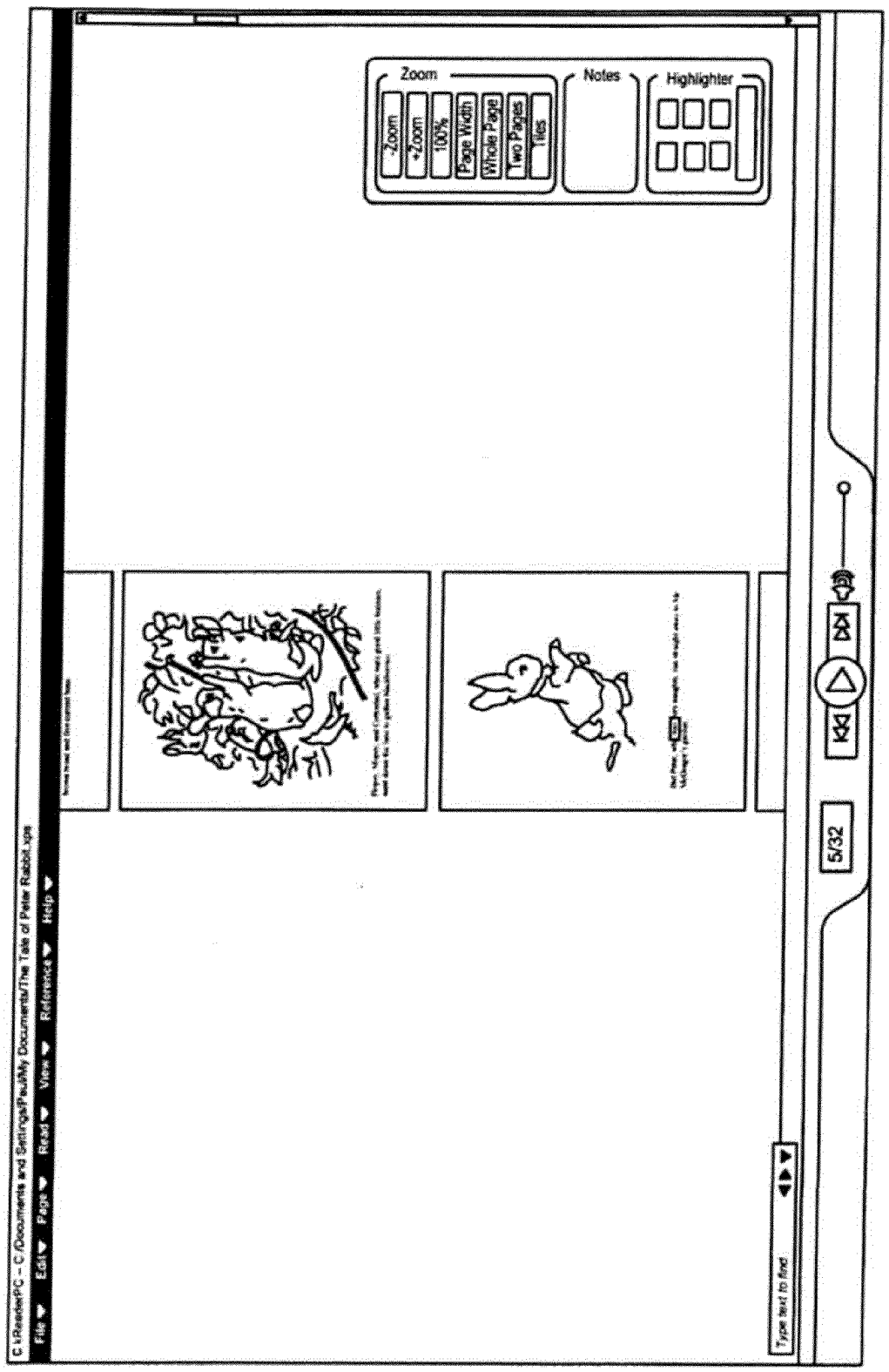
FIG. 12 is a screenshot of text.
Figure 13:
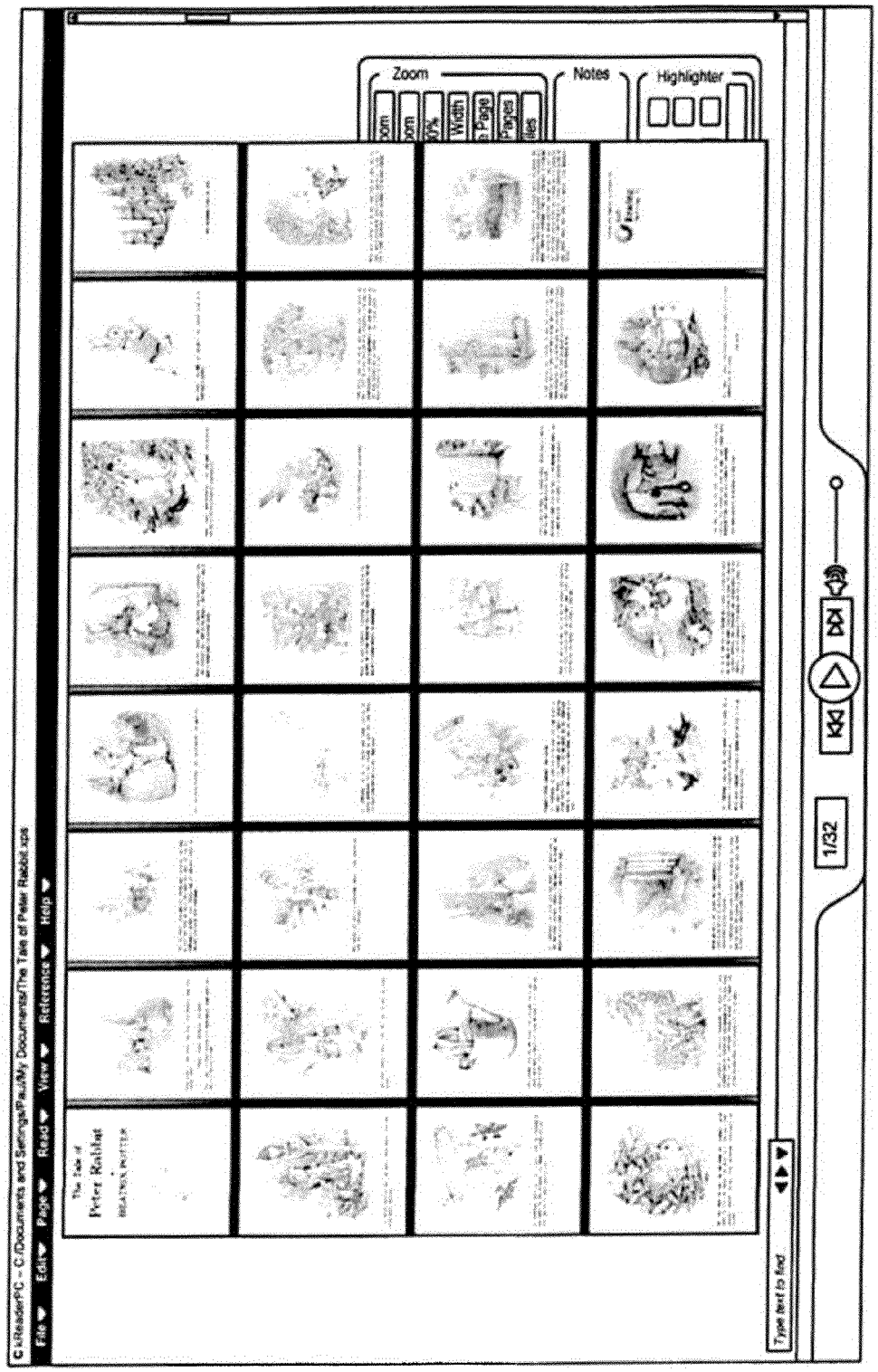
FIG. 13 is a screenshot of text.

Referring to FIGS. 12 and 13, a text that includes multiple pages can be formatted into the book view shown in FIG. 11 where two pages are arranged side-by-side and the pages are turned to reveal two new pages. Highlighting and association of different characters and voice models with different portions of the text can be used with both standard and book-view texts. In the case of a book-view text, the computer system includes page turn indicators which synchronize the turning of the page in the electronic book with the reading of the text in the electronic book. In order to generate the book-view from a document such as Word or PDF document, the computer system uses the page break indicators in the two-dimensional document to determine the locations of the breaks between the pages. Page turn indicators are added to every other page of the book view.

A user may desire to share a document with the associated characters and voice models with another individual. In order to facilitate in such sharing, the associations of a particular character with portions of a document and the character models for a particular document are stored with the document. When another individual opens the document, the associations between the assigned characters and different portions of the text are already included with the document.

Text-To-Speech (TTS) voice models associated with each character can be very large (e.g., from 15-250 Megabytes) and it may be undesirable to send the entire voice model with the document, especially if a document uses multiple voice models. In some embodiments, in order to eliminate the need to provide the voice model, the voice model is noted in the character definition and the system looks for the same voice model on the computer of the person receiving the document. If the voice model is available on the person's computer, the voice model is used. If the voice model is not available on the computer, metadata related to the original voice model such as gender, age, ethnicity, and language are used to select a different available voice model that is similar to the previously used voice model.

In some additional examples, it can be beneficial to send all needed voice models with the document itself to reduce the likelihood that the recipient will not have appropriate voice models installed on their system to play the document. However, due to the size of the TTS voice models and of human voice-based voice models comprised of stored digitized audio, it can be prohibitive to send the entire voice model. As such, a subset of words (e.g., a subset of TTS generated words or a subset of the stored digitized audio of the human voice model) can be sent with the document where the subset of words includes only the words that are included in the documents. Because the number of unique words in a document is typically substantially less than all of the words in the English language, this can significantly reduce the size of the voice files sent to the recipient. For example, if a TTS speech generator is used, the TTS engine generates audio files (e.g., wave files) for words and those audio files are stored with the text so that it is not necessary to have the TTS engine installed on a machine to read the text. The number of audio files stored with the text can vary, for example, a full dictionary of audio files can be stored. In another example, only the unique audio files associated with words in the text are stored with the text. This allows the amount of memory necessary to store the audio files to be substantially less than if all words are stored. In other examples, where human voice-based voice models comprised of stored digitized audio are used to provide the narration of a text, either all of the words in the voice model can be stored with the text or only a subset of the words that appear in the text may be stored. Again, storing only the subset of words included in the text reduces the amount of memory needed to store the files.

In some additional examples, only a subset of the voice models are sent to the recipient. For example, it might be assumed that the recipient will have at least one acceptable voice model installed on their computer. This voice model could be used for the narrator and only the voice models or the recorded speech for the characters other than the narrator would need to be sent to the recipient.

In some additional examples, in addition to associating voice models to read various portions of the text, a user can additionally associate sound effects with different portions of the text. For example, a user can select a particular place within the text at which a sound effect should occur and/or can select a portion of the text during which a particular sound effect such as music should be played. For example, if a script indicates that eerie music plays, a user can select those portions of the text and associate a music file (e.g., a wave file) of eerie music with the text. When the system reads the story, in addition to reading the text using an associated voice model (based on voice model highlighting), the system also plays the eerie music (based on the sound effect highlighting).

The systems and methods described herein can be implemented in digital electronic circuitry, or in computer hardware, firmware, software, web-enabled applications, or in combinations thereof. Data structures used to represent information can be stored in memory and in persistent storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

A portion of the disclosure of this patent document contains material which is subject to copyright protection (e.g., the copyrighted names mentioned herein). This material and the characters used herein are for exemplary purposes only. The characters are owned by their respective copyright owners.

Other implementations are within the scope of the following claims:

What is claimed is:

1. A computer implemented method comprising:
   applying speech recognition by one or more computer systems to an audio recording to generate a text version of recognized portions of text;
   determining by the one or more computer systems an elapsed time period from a reference time in the audio recording to each portion of text in the recognized portions of text;
   comparing by the one or more computer systems a recognized portion of text to an expected portion of text;
   determining by the one or more computer systems a number of syllables or phonemes in a sequence of expected words that are part of the expected portion of text;
   determining by the one or more computer systems a corresponding recognized portion comprising a sequence of recognized words, the sequence of expected words and sequence of recognized words having a same number of syllables or phonemes and a different number of words;
   determining by the one or more computer systems an elapsed time for the corresponding recognized portion;
   storing the determined elapsed time in a timing file that is stored on a computer-readable storage device, the timing file further comprising the elapsed time information for each expected portion of text;
   receiving from a user an indication of a user-selected portion of text;
   determining by the one or more computers an elapsed time in the audio recording by referencing the timing file associated with the user-selected portion of text; and
   providing an audible output corresponding to the audio in the audio recording at the determined elapsed time in the audio recording.

2. The method of claim 1 wherein generating the timing file comprises:
   storing the elapsed time information for a recognized portion of text in the timing file if the recognized portion of text matches the corresponding expected portion of text; and storing the determined elapsed time information for recognized words having the same number of syllables or phonemes and the different number of words into the timing file when the recognized portion of text does not match the corresponding expected portion of text.

3. The method of claim 2 wherein the recognized portions or expected portions of text comprise words.

4. The method of claim 2 wherein determining the elapsed time for the corresponding recognized portion further comprises:
determining the elapsed time for an expected portion of text based on a metric associated with an expected length of time to speak the expected portion of text.

5. The method of claim 1 wherein providing an audible output comprises providing audio beginning with a first word in the user-selected portion of text and continuing until the end of the document.

6. The method of claim 1 wherein providing an audible output comprises providing audio corresponding to the user-selected portion of text.

7. The method of claim 6, further comprising ceasing providing the audio output upon reaching a last word in the user-selected portion of text.

8. A computer program product tangibly stored on a computer readable storage device, the computer program product comprising instructions for causing a processor to:
apply speech recognition to an audio recording to generate a text version of recognized portions of text;
determine an elapsed time period from a reference time in the audio recording to each portion of text in the recognized portions of text;
compare a recognized portion of text to an expected portion of text;
determine a number of syllables or phonemes in a sequence of expected words that are part of the expected portion of text;
determine a corresponding recognized portion comprising a sequence of recognized words, the sequence of expected words and sequence of recognized words having a same number of syllables or phonemes and a different number of words;
determine an elapsed time for the corresponding recognized portion;
store the determined elapsed time in a timing file that is stored on a computer-readable storage device, the timing file further comprising the elapsed time information for each expected portion of text;
receive an indication of a user-selected portion of text;
determine an elapsed time in the audio recording by referencing the timing file associated with the user-selected portion of text; and
provide an audible output corresponding the audio in the audio recording at the determined elapsed time in the audio recording.

9. The computer program product of claim 8 wherein instructions to generate the timing file comprises instructions to:
store the elapsed time information for a recognized portion of text in the timing file if the recognized portion of text matches the corresponding expected portion of text; and
store the determined elapsed time information for recognized words having the same number of syllables or phonemes and the different number of words into the timing file when the recognized portion of text does not match the corresponding expected portion of text.

10. The computer program product of claim 9 wherein instructions to determine the elapsed time for the corresponding recognized portion further comprises instructions to:
determine the elapsed time for an expected portion of text based on a metric associated with an expected length of time to speak the expected portion of text.

11. The computer program product of claim 9 wherein instructions to provide an audible output comprises instructions to provide audio corresponding to the user-selected portion of text.

12. The computer program product of claim 9 wherein instructions to provide an audible output comprises instructions to cease providing the audio output upon reaching a last word in the user-selected portion of text.

13. The computer program product of claim 8 further comprising instructions to:
determine the elapsed time for an expected portion of text based on a metric associated with an expected length of time to speak the expected portion of text.

14. A system comprising:
a memory; and
a computing device configured to:
apply speech recognition to an audio recording to generate a text version of recognized portions of text;
determine an elapsed time period from a reference time in the audio recording to each portion of text in the recognized portions of text;
compare a recognized portion of text to an expected portion of text;
determine a number of syllables or phonemes in a sequence of expected words that are part of the expected portion of text;
determine a corresponding recognized portion comprising a sequence of recognized words, the sequence of expected words and sequence of recognized words having a same number of syllables or phonemes and a different number of words;
determine an elapsed time for the corresponding recognized portion;
store the determined elapsed time in a timing file that is stored on a computer-readable storage device, the timing file further comprising the elapsed time information for each expected portion of text;
receive an indication of a user-selected portion of text;
determine an elapsed time in the audio recording by referencing the timing file associated with the user-selected portion of text; and
provide an audible output corresponding the audio in the audio recording at the determined elapsed time in the audio recording.

15. The system of claim 14 wherein the computing device is configured to:
store the elapsed time information for a recognized portion of text in the timing file if the recognized portion of text matches the corresponding expected portion of text; and
compute elapsed time information for an expected portion of text and store the determined elapsed time information for recognized words having the same number of syllables or phonemes and the different number of words into the timing file when the recognized portion of text does not match the corresponding expected portion of text.

16. The system of claim 15 wherein the computing device configured to determine the elapsed time for the corresponding recognized portion is further configured to:

determine the elapsed time for an expected portion of text based on a metric associated with an expected length of time to speak the expected portion of text.

17. The system of claim 14 wherein the computing device is further configured to provide audio corresponding to the user-selected portion of text.

18. The system of claim 14 wherein the computing device is further configured to cease providing the audio output upon reaching a last word in the user-selected portion of text.

* * * * *